United States Patent
Kanuturi et al.

(10) Patent No.: US 9,704,139 B2
(45) Date of Patent: Jul. 11, 2017

(54) TECHNIQUES FOR REQUESTING WEB CONFERENCE RECORDINGS AUTOMATICALLY VIA A CONFERENCE INVITATION RESPONSE

(71) Applicant: Cisco Technology, Inc., San Jose, CA (US)

(72) Inventors: Nagendra Kanuturi, Bangalore (IN); Debanjan Biswas, Bangalore (IN); Neha Dar, Bangalore (IN); Shridurgha Janakiraman, Bangalore (IN); Preetham M S, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 822 days.

(21) Appl. No.: 14/029,024

(22) Filed: Sep. 17, 2013

(65) Prior Publication Data
US 2015/0081806 A1     Mar. 19, 2015

(51) Int. Cl.
  *G06F 15/16* (2006.01)
  *G06Q 10/10* (2012.01)

(52) U.S. Cl.
  CPC .............. *G06Q 10/1095* (2013.01)

(58) Field of Classification Search
  USPC ............. 709/206, 220; 348/14.09; 370/260; 379/202.88
  See application file for complete search history.

(56) References Cited

U.S. PATENT DOCUMENTS

| | | | |
|---|---|---|---|
| 8,121,277 B2 * | 2/2012 | Baird | H04L 12/1831 370/260 |
| 8,175,243 B2 * | 5/2012 | Mahalingam | H04M 3/56 348/14.09 |
| 8,422,643 B2 | 4/2013 | Ratzlaff et al. | |
| 9,204,098 B1 * | 12/2015 | Cunico | H04N 7/15 |
| 2006/0056614 A1 * | 3/2006 | Chiu | H04M 3/533 379/202.01 |
| 2012/0188330 A1 * | 7/2012 | Turner | H04L 12/1818 348/14.08 |

(Continued)

OTHER PUBLICATIONS

Radvision, "Sending a Meeting Invitation with iVIEW Microsoft Outlook Add-on," User Guide for SCOPIA Video Gateway for Microsoft Lync Version 7.7, retrieved from http://docs.radvision.com/bundle/uc_gw_ug/iv_addon_outlook_SendMeetingInvitation, on Sep. 17, 2013, 2 pages.

(Continued)

*Primary Examiner* — Tammy Nguyen
(74) *Attorney, Agent, or Firm* — Edell, Shapiro & Finnan, LLC

(57) ABSTRACT

Techniques are presented for recording and delivering content associated with a teleconference meeting. At a server device, a message is sent to a first endpoint device. The message comprises an invitation to join a teleconference meeting. The message also comprises an option for a user at the first endpoint device to respond to the message with a request to record the teleconference meeting. A response message is received from the first endpoint device. The response message contains an indication of whether or not the user will join the teleconference meeting and a request to record the teleconference meeting. A host at a second endpoint device is presented with the request from the user to record the teleconference meeting.

17 Claims, 8 Drawing Sheets

(56) References Cited

U.S. PATENT DOCUMENTS

2012/0314849 A1\* 12/2012 LeBlanc ........... H04M 3/42221
  379/88.23
2013/0018654 A1 1/2013 Toebes

OTHER PUBLICATIONS

Fuzebox Support, "What do I need to know about meeting recording?," Jul. 21, 2011, retrieved from http://support.fuzemeeting.com/entries/20301366-what-do-i-need-to-know-about-meeting-recording, 3 pages.

\* cited by examiner

220

Settings                                                               [X]

┌─ Meeting Information ─────────────────────────────────────────────┐
│                                                                    │
│      Meeting template:  [MC: MC Default              ▼]            │
│         Service type:   [Meeting Center Pro+MPV      ▼]            │
│      Meeting password:  [                    ]  *                  │
│                                                                    │
│              ☐ Exclude password from email invitation              │
│              ☐ List this meeting on the WebEx site                 │
│              ☑ Attendees can join meeting                          │
└────────────────────────────────────────────────────────────────────┘

┌──────────────┬──────────────┬───────────┬───────────┬──────────────┐
│ Audio & Tracking │ Registration │ Resources │ Recording │              │
├──────────────┴──────────────┴───────────┴───────────┴──────────────┤
│  ○ Record and share it with every attendee                          │
│  ○ Accept Recording Request from attendees and share it with requested attendees │
│  ○ Recording requests should be approved by host before sharing     │
│  ⦿ Manual Recording                                                 │
│                                                                     │
└─────────────────────────────────────────────────────────────────────┘

* Required fields                              [  OK  ]  [ Cancel ]

```
┌─────────────────────────────────────────────────────────────┐
│ SEND TO A USER IN A NETWORK A MESSAGE COMPRISING AN         │── 410
│ INVITATION TO JOIN A TELECONFERENCE MEETING AND AN          │
│ OPTION FOR THE USER TO RESPOND TO THE MESSAGE WITH A        │
│ REQUEST TO RECORD THE TELECONFERENCE MEETING                │
└─────────────────────────────────────────────────────────────┘
                              │
                              ▼
┌─────────────────────────────────────────────────────────────┐
│ RECEIVE FROM THE USER A RESPONSE MESSAGE THAT               │── 420
│ CONTAINS AN INDICATION OF WHETHER OR NOT THE USER WILL      │
│ JOIN THE TELECONFERENCE MEETING AND A REQUEST TO            │
│ RECORD THE TELECONFERENCE MEETING                           │
└─────────────────────────────────────────────────────────────┘
                              │
                              ▼
┌─────────────────────────────────────────────────────────────┐
│ MODIFY ATTRIBUTES OF THE TELECONFERENCE MEETING SUCH        │── 430
│ THAT A HOST OF THE TELECONFERENCE MEETING IS PRESENTED      │
│ WITH THE REQUEST FROM THE USER TO RECORD THE                │
│ TELECONFERENCE MEETING                                      │
└─────────────────────────────────────────────────────────────┘
```

FIG.4

TECHNIQUES FOR REQUESTING WEB CONFERENCE RECORDINGS AUTOMATICALLY VIA A CONFERENCE INVITATION RESPONSE

TECHNICAL FIELD

The present disclosure relates to recording and delivering content of a teleconference meeting.

BACKGROUND

In network environments, users that are located remote to one another may attempt to participate in a web-enabled teleconference over a network (e.g., the Internet). For example, a user may set up a teleconference meeting by using web-enabled teleconference software. The user (e.g., the "host" of the teleconference meeting) may then send a message to one or more other users in the network environment inviting the users to participate in the teleconference meeting. The message may be sent to the other users via an email client. Upon receiving the message, the users may respond to the invitation declaring their availability and intent to participate in the teleconference meeting. When the teleconference meeting begins, the host may record the meeting, and users who were not able to join the meeting may have to independently request the recording from the host (e.g., by emailing the host for a file copy of the recording). Likewise, users who did join the meeting may also have to independently request the recording from the host.

BRIEF DESCRIPTION OF THE DRAWINGS

FIGS. 2A-2C show example screen shots of user interface screens presented to users in connection with requests to record the teleconference meeting.

FIG. 4 shows an example flow chart depicting operations for the conference server to send the invitation message to the users with the option to record the teleconference meeting.

DESCRIPTION OF EXAMPLE EMBODIMENTS

Overview

Techniques are presented for recording and delivering content associated with a teleconference meeting. At a server device, a message is sent to a first endpoint device. The message comprises an invitation to join a teleconference meeting. The message also comprises an option for a user at the first endpoint device to respond to the message with a request to record the teleconference meeting. A response message is received from the first endpoint device. The response message contains an indication of whether or not the user will join the teleconference meeting and a request to record the teleconference meeting. A host at a second endpoint device is presented with the request from the user to record the teleconference meeting.

Example Embodiments

Figure 1:
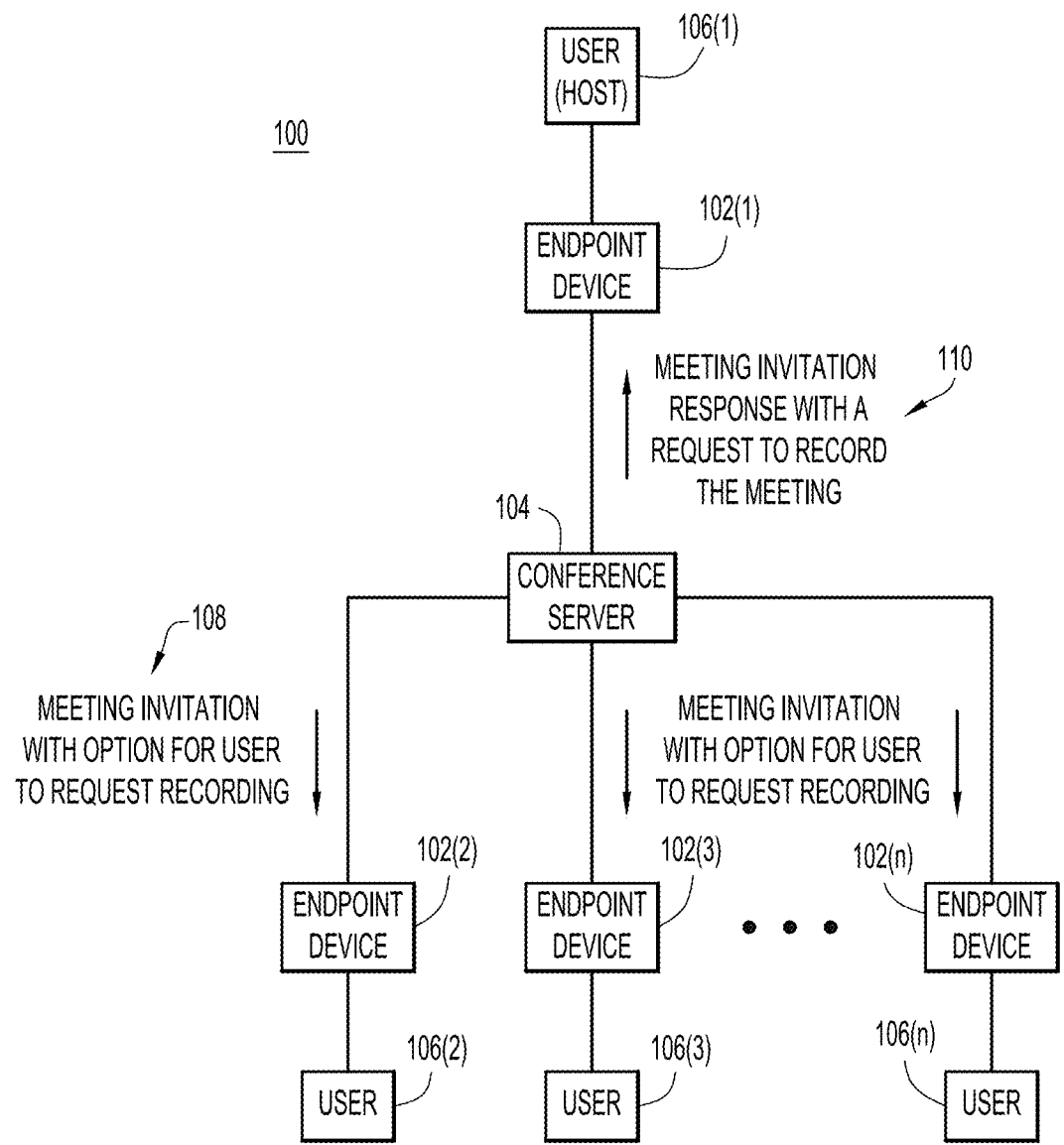
FIG. 1 shows an example network topology depicting a conference server that enables a host of a teleconference meeting to send an invitation message to users in the network to join a teleconference meeting with an option to request a recording the teleconference meeting.

The techniques described herein relate to recording a teleconference meeting between users in a network environment. An example system topology (hereinafter "system" or "network") is shown at reference numeral 100 in FIG. 1. The network 100 comprises a plurality of endpoint devices 102(1)-102(n). Each of the endpoint devices 102(1)-102(n) is in communication with a conference server 104. For example, the endpoint devices 102(1)-102(n) may be remote to one another and may be in communication with a conference server 104 via a Wide Area Network (WAN) (not shown in FIG. 1). Users may be located at each of the endpoint devices 102(1)-102(n). For example, FIG. 1 shows user 106(1) located at endpoint device 102(1), user 106(2) located at endpoint device 102(2), user 106(3) located at endpoint device 102(3) and user 106(n) located at endpoint device 102(n). It should be appreciated that any number of users may be located at each of the endpoint devices 102(1)-102(n) and that the depiction in FIG. 1 is merely an example.

The endpoint devices 102(1)-102(n) are network devices that enable the users 106(1)-106(n) (e.g., "users" or "attendees") to participate in an audio/video teleconference meeting ("teleconference meeting" or "meeting") with each other. The teleconference meeting may be, for example, a web-based teleconference meeting. For example, the endpoint devices 102(1)-102(n) may be desktop computers, laptops, tablets, mobile devices, etc. that are enabled with an audio/video component (e.g., a camera) that is able to record audio and video data of a user and to send the data to other users via other endpoint devices. Additionally, each of the endpoint devices 102(1)-102(n) may be configured with software that enables it to share files (e.g., by sharing desktop visibility) with other users via other endpoint devices.

The conference server 104 is a network server device that enables the endpoint devices 102(1)-102(n) to participate in a teleconference. For example, the conference server may receive a request from one of the users 106(1)-106(n) who is seeking to conduct a teleconference meeting. Upon receiving the request, the conference server may send out meeting invitation messages to the other users in the network 100. For example, in FIG. 1, user 106(1) may seek to conduct a teleconference meeting with users 106(2)-106(n). The user 106(1) sends a message, via endpoint device 102(1) that reaches the conference server 104. The conference server then sends meeting invitation messages to users 106(2)-106(n) via their respective endpoint devices 102(2)-102(n). In one example, the conference server 104 may synchronize with email clients (not shown in FIG. 1) of the endpoint devices 102(2)-102(n) to send the meeting invitation messages (e.g., as an email message).

Typically, one of the users 106(1)-106(n) will be designated as the "host" of a teleconference meeting, and often, the user who initiates a request for a teleconference meeting will be designated as the host. For example, in FIG. 1 user 106(1) is designated as the host. User 106(1) may have been designated as a host by requesting at teleconference meeting or may have been designated as a host by another user who requested a teleconference meeting.

As stated above the teleconference meeting may be requested by the host user (e.g., user 106(1)) and an invitation message may be sent from the conference server 104 to the other users 106(2)-106(n) via respective endpoint devices **102(2)-102(*n*). The users 106(2)-106(*n*) may receive the invitation message for the teleconference meeting via an email client hosted by the respective endpoint devices 102(2)-102(*n*). For example, each of the users 106(2)-106(*n*) may receive a Microsoft Outlook® email message containing a meeting invitation request for a teleconference meeting initiated by the host user 106(1). The meeting invitation request may contain a proposed date and time for the teleconference meeting. Each of the users 106(2)-106(*n*) may have several options for responding to the email message. For example, each of the users 106(2)-106(*n*)** may respond with an indication of accepting the request to participate in the teleconference meeting, declining the request to participate in the teleconference meeting, tentatively accepting or declining the request and/or proposing a date and time different from that in the original meeting request.

Often, one or more of the users **106(2)-106(*n*) may not be able to join the teleconference meeting proposed by the host user 106(1) due to scheduling conflicts or other reasons for unavailability. Despite their inability to attend, however, the users may wish to access the contents of the teleconference meeting. For example, the host user 106(1) may record the teleconference meeting, and after the meeting ends, the recording may be made available to users 106(2)-106(*n*), regardless of whether or not they participated in the meeting. For example, the host user 106(1) may record the meeting using recording software on the teleconference meeting platform or the conference server 104**.

Presently, when users receive an invitation message to participate in a teleconference meeting, the users are provided only with an option to indicate whether or not they will participate in the teleconference meeting. Users are not provided with an option to request that the host record the meeting at the time of receiving the invitation message. Often, the users may have to manually request the host to record the meeting (e.g., by sending an email or otherwise contacting the host) and may need to rely on the host's diligence in remembering to record the teleconference meeting in order to later access it. That is, if the host forgets to record the meeting or if a user forgets to request a recording, the user may not have access to the content of the meeting, since no recording will have been made. Additionally, the host may record the meeting but may forget to share the recording with the invitees.

The techniques described herein alleviate these concerns by allowing a user to request a recording of a teleconference meeting upon receiving an invitation message. That is, as described herein, a user is provided with an option of requesting a recording of the meeting at the time the user responds to an invitation message. Additionally, the techniques described herein automate the sharing of a recording of a meeting. As shown in FIG. 1, for example, host user 106(1) may initiated a request for a teleconference meeting, and at reference numerals 108, the conference server 104 sends to the users **106(2)-106(*n*) a message that has an invitation to join the teleconference meeting and an option for the users 106(2)-106(*n*) to respond to the message with a request for the host user 106(1) to record the teleconference meeting. One or more of the users 106(2)-106(*n*) may respond with a request for the host user 106(1) to record the teleconference meeting. At reference numeral 110, the conference server 104 may then send the meeting invitation response to the user host 106(1) (via endpoint device 102(1)). The meeting invitation response indicates to the host user 106(1) that one or more of the users 106(2)-106(*n*) have requested a recording of the teleconference meeting. The requests to record the teleconference meeting are stored on the conference server 104** along with a list of users who accept and/or decline the invitation to join the teleconference meeting.

Figure 2A:
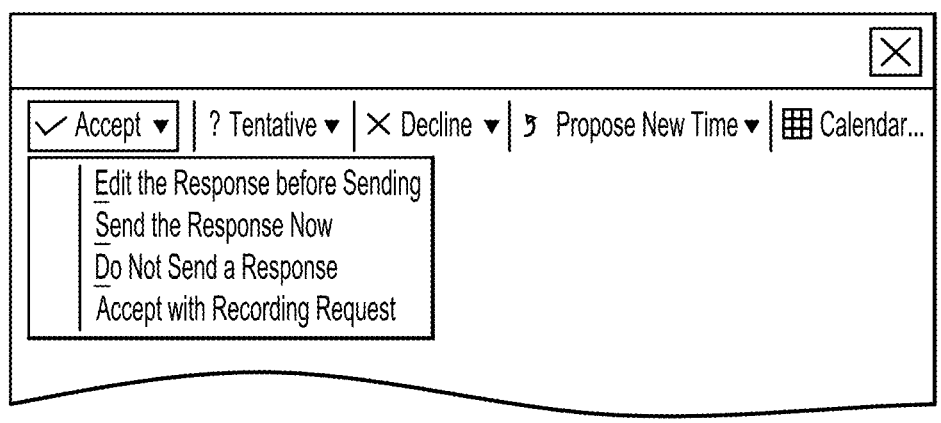
Figure 2B:
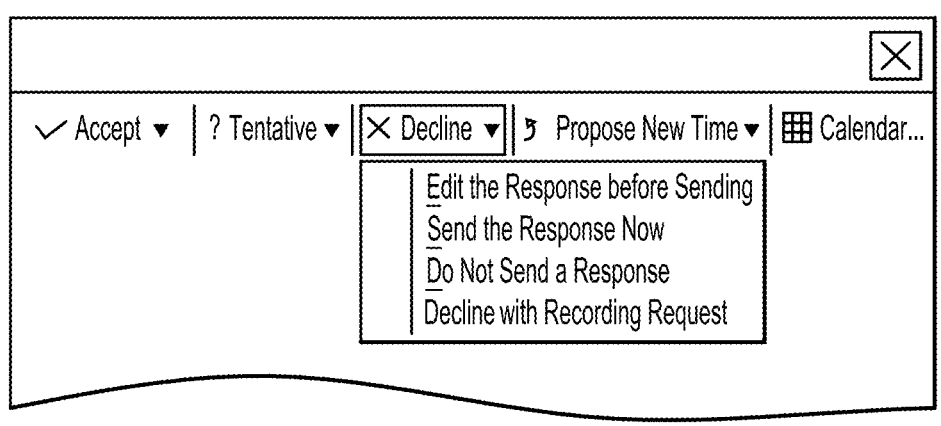

Referring now to FIGS. 2A-2C, example user interface screen shots are depicted that present an option to users to request a recording of a teleconference meeting. FIG. 2A shows, at reference numeral 200, a user interface screen presented to a user (meeting invitee) with an invitation to join a teleconference meeting. As shown in FIG. 2A, the user interface screen presents options by which a user may accept the invitation to join the teleconference meeting and send a request for the host to record the teleconference meeting. Noteworthy is the option in the Accept response of "Accept with Recording Request" which will send an indication that the user accepts the meeting invitation and requests the host to record the meeting. FIG. 2B shows, at reference numeral 210, a user interface screen that is presented to the user (invitee) which includes an option to decline the invitation to join the teleconference meeting while still being able to request the recording to the teleconference meeting. Noteworthy in FIG. 2B is the option in the Decline response of "Decline with Recording Request" which will send an indication that the user declines the meeting invitation (i.e., indicating that the user will not attend the meeting) but still requests that the meeting be recorded.

FIG. 2C shows an example screen shot 220 of a user interface screen containing that is presented to a host. The user interface screen 220 includes several recording options. As shown, for one option, the host user can record the meeting and share it with every user ("invitee"). For another option, the host can accept a recording request from a user and share it with the user making the request. For still another option, the host deny/decline the request to record the meeting, and require that he/she approve the recording request (on an ad hoc basis) before a user is permitted to have access to it (at a later time when a user requests access to the recording). Still another option is one in which the host can also manually record the teleconference meeting independent of whether or not a user has made a recording request. It should be appreciated that the term "invitee" may refer to users who are invited to the meeting but who may not necessarily participate in the meeting. The term "attendee" is also used herein to describe users who are invited to the meeting and participate (or "attend") the meeting.

Figure 3A:
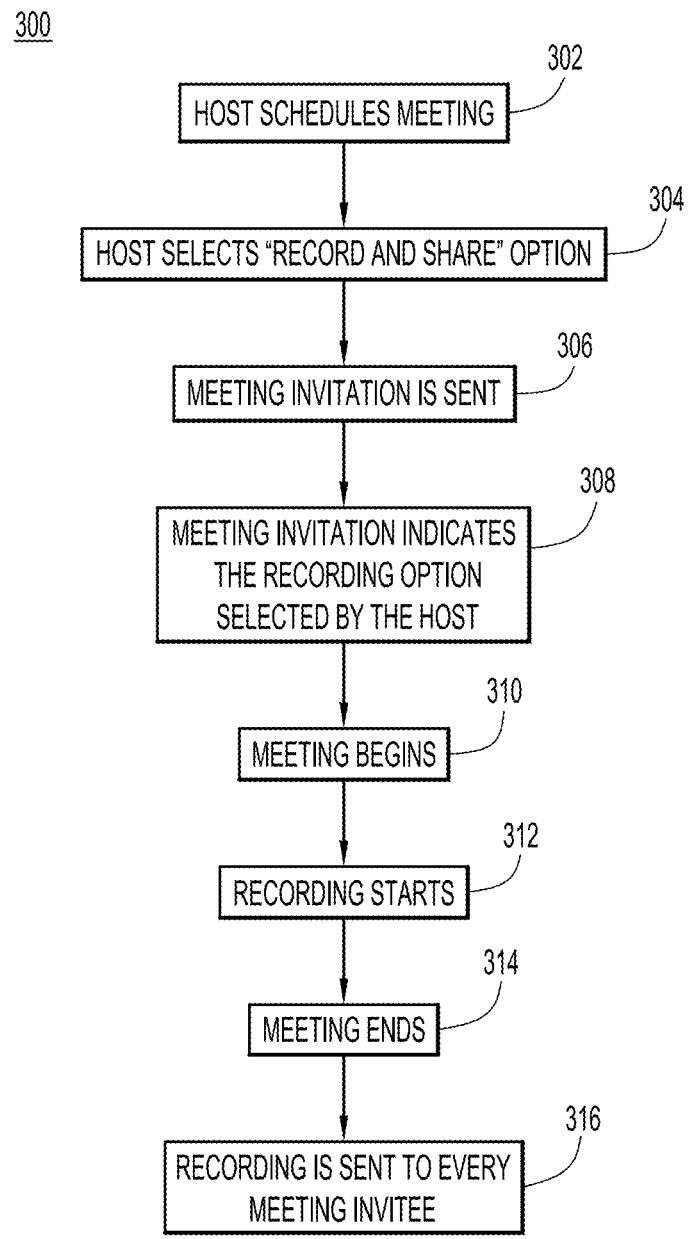
FIGS. 3A-3C show example flow charts depicting processes for embodiments where users may request to record a teleconference meeting.
Figure 3B:
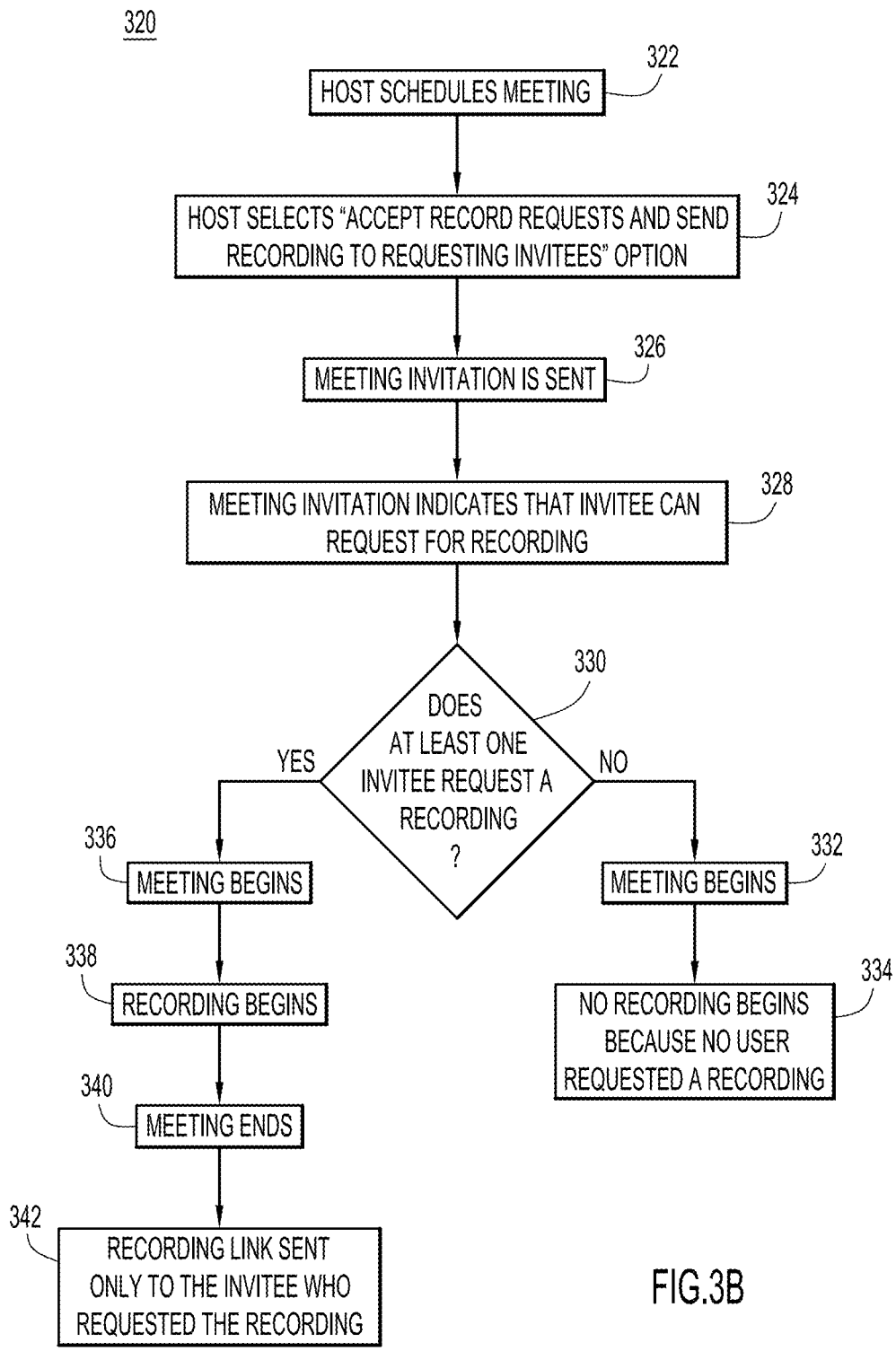
Figure 3C:
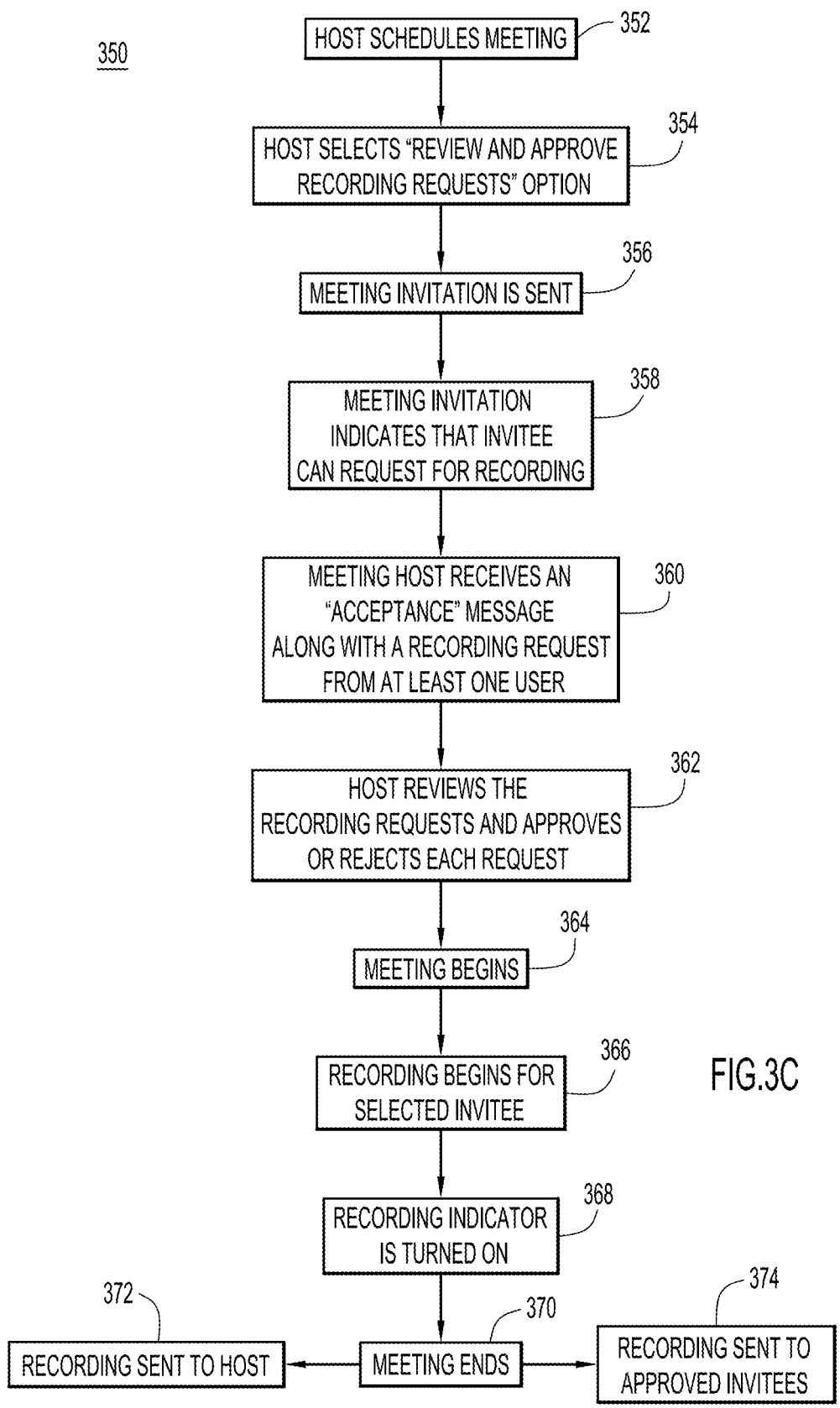

Reference is now made to FIGS. 3A-3C. FIGS. 3A-3C show example flow charts depicting processes for embodiments where users may request to record a teleconference meeting. Reference is made to FIG. 3A, which shows a flow chart 300 for the host user 106(1) sending a recording link to every meeting invitee. At reference numeral 302, the host user 106(1) schedules a teleconference meeting, and at 304, the host selects a "record and share" option for the teleconference meeting. At 306, an invitation message is sent to the users **106(2)-106(*n*). At 308, the users receive the invitation message, which indicates the recording option selected by the host. The teleconference meeting begins (e.g., automatically or manually at the direction of the host user) at 310, and at 312, a recording of the teleconference meeting is made. At 314, the meeting ends, and the recording is provided to the invitees/attendees at 316**. The recording may be provided to the invitees/attendees via a web-based interface that enables the users/attendees to access the recording after the meeting has ended.

Reference is now made to FIG. 3B. FIG. 3B shows a flow chart 320 for the host user sending the recording of the teleconference meeting only to users who have requested the recording. At 322, the host user 106(1) schedules the teleconference meeting, and at 324, the host user 106(1) selects an option to accept recording requests from users. At 326, the host user 106(1) sends an invitation message for the meeting to the users, and at 328, the users indicate whether or not they can attend the meeting. At 330, a determination is made as to whether or not one or more of the users also sends a request for the host user 106(1) to record the meeting. If not, the meeting begins at 332, and no recording begins since no user requested it (as shown at reference 334). If one or more of the users sends a request to record the meeting, the meeting begins at 336, at the recording of the meeting begins (e.g., automatically) at 338. At 340, the meeting ends, and at 342, the recording link is sent only to the users who requested the recording. The recording may be provided to these users via a web-based interface that enables the users to access the recording after the teleconference meeting has ended. In some embodiments, it may be possible that the recording link is provided to all of the invitees irrespective of whether they requested the recording.

Reference is now made to FIG. 3C. FIG. 3C shows a flow chart 350 for the host user sending the recording to the teleconference meeting to selected users who request the recording. At 352, the host user 106(1) schedules the teleconference meeting, and at 354, selects an option for reviewing and approving recording requests received from other users. At 356, the host user 106(1) sends the invitation meeting message to the users 106(2)-106(n), and at 358, the users indicate whether or not they can attend the meeting. The users also may also send a request to the host user to record the meeting. At 360, the host user receives an acceptance message from a user along with a request to record the meeting. It should be appreciated that the host user may also receive a request to record the meeting together with a declining message from the user or together with a tentative accept/decline message from the user. At 362, the host user reviews the request to recording the meeting, and approves or rejects it. It should be appreciated that the host user may reject the request to record the meeting without the user who made the request being notified of this decision. At 364, the meeting begins, and at 366, the recording begins only for selected attendees. At 368, an indicator (e.g., a red color indicator) is displayed as a courtesy to indicate that the meeting is being recorded, even for those who cannot receive the recording link. At 370, the meeting ends. The recording link is sent to the host user 106(1) at 372, and the recording link is also sent to the approved users/attendees at 374. Thus, access to the recording of the teleconference meeting is provided only to users whose request to record the teleconference meeting has been accepted and approved by the host user. In one example, it may be possible that the recording link is provided to all of the invitees irrespective of whether they requested a recording of the meeting. It should be appreciated that in each embodiment described in FIGS. 3A-3C, the recording indicator light may be turned on, and the recording link may be provided to the host upon completion of the meeting.

Reference is now made to FIG. 4, which shows an example flow chart 400 depicting operations for the conference server to send an invitation message to users with an option for the users to record the teleconference meeting. At operation 410, a message is sent to a user in the network comprising an invitation to join a teleconference meeting and an option for the user to respond to the message with a request to record the teleconference meeting. At operation 420, a response message is received from the user that contains an indication of whether or not the user will join the teleconference meeting and may also include a request to record the teleconference meeting. At operation 430, attributes of the teleconference meeting are modified such that a host of the teleconference meeting is presented with the request from the user to record the teleconference meeting.

Figure 5:
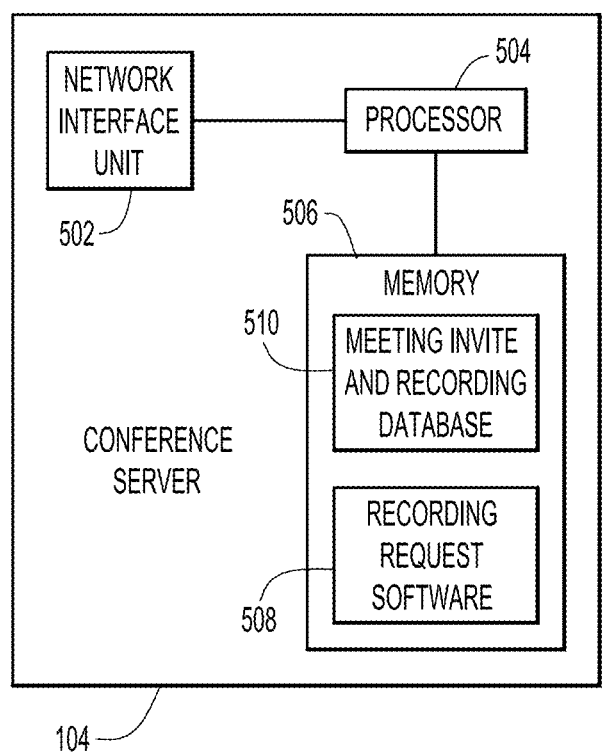
FIG. 5 shows an example block diagram of the conference server configured to send the invitation message for the teleconference meeting to the users.

Reference is now made to FIG. 5. FIG. 5 shows an example block diagram of the conference server 104. As stated above, the conference server 104 may be a server device in the network 100 in FIG. 1. The conference server 104 comprises a network interface unit 502, a processor 504 and a memory 506.

The network interface unit 502 is configured to send and receive communications (e.g., data packets and other communications) to devices (e.g., the endpoint devices 102(1)-102(n)) in the network 100. The processor 504 is, for example, a microprocessor or microcontroller that is configured to execute program logic instructions (i.e., software) for carrying out various operations and tasks of conference server 104, as described herein. For example, the processor 504 is configured to execute the recording request software 508 to send an invitation message for the teleconference meeting to the users and to receive response messages to the invitation messages from the users. The functions of the processor 504 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 506 may comprise read only memory (ROM), random access memory (RAM), magnetic disk storage media devices, optical storage media devices, flash memory devices, electrical, optical, or other physical/tangible (non-transitory) memory storage devices. The memory 506 stores instructions for the recording request software 508. The memory 506 also stores a meeting invite and recording database 510 that stores information about the teleconference meeting (e.g., the meeting recording, host user, list of attendees, requests for accessing the recording, etc.). Thus, in general, the memory 506 may comprise one or more computer readable storage media (e.g., a memory storage device) encoded with software comprising computer executable instructions and when the software is executed (e.g., by the processor 906) it is operable to perform the operations described herein.

The recording request software 508 may take any of a variety of forms, so as to be encoded in one or more tangible computer readable memory media or storage device for execution, such as fixed logic or programmable logic (e.g., software/computer instructions executed by a processor), and the processor 504 may be an application specific integrated circuit (ASIC) that comprises fixed digital logic, or a combination thereof.

In still another example, the processor 504 may be embodied by digital logic gates in a fixed or programmable digital logic integrated circuit, which digital logic gates are configured to execute the recording request software 508. In general, the recording request software 508 may be embodied in one or more computer readable storage media encoded with software comprising computer executable instructions and when the software is executed operable to perform the operations described above.

It should be appreciated that the techniques described above in connection with all embodiments may be performed by one or more computer readable storage media that is encoded with software comprising computer executable instructions to perform the methods and steps described herein. For example, the operations performed by the conference server 104 may be performed by one or more computer or machine readable storage media (non-transitory) or device executed by a processor and comprising software, hardware or a combination of software and hardware to perform the techniques described herein.

It should further be appreciated that the techniques described herein may be implemented or incorporated in one of several use cases. For example, in some embodiments, a meeting host may select (e.g., via a checklist during a meeting setup) invitees that the host would like to grant the ability to request and/or receive a recording. In another example, it may be possible for an invitee to respond multiple times to a meeting invite, possibly with a request to record. In this example, the last response (received before the meeting ends) is considered by the host as the most accurate request. The recording begins from whenever the request is made or approved, depending on the privileges granted by the host during setup. In another example, it may be possible for indirect invitees (e.g., users to whom invitees forwarded the meeting invite on behalf of the host) to request and/or receive a recording. The administrator may make this option available to the host. The host, in turn, may be allowed to select and configure this option during the meeting setup. It may also be possible for attendees to request a recording via a web interface (e.g., a "request recording" button on a teleconference hosting service) after the meeting has started. Furthermore, it may also be possible for the host to send the recording to all direct and indirect invitees as well as attendees, including those who did not request the recording and were not part of the original or forwarded invite. In one example, the host may override previously granted privileges at any time before the meeting ends, and in some embodiments, the host may be presented with a list of options for sharing the recording when the meeting ends. That is, the host may send a message indicating the he/she overrides a meeting attendee/invitee's request to record the meeting and deny the request to record the meeting. The host may then choose to continue with the originally granted privileges, revoke privileges from some invitees/attendees (via a checklist, for example), or add users or groups with whom to share the recording.

In summary, a method is provided comprising: at a server device, to a first endpoint device a message comprising an invitation to join a teleconference meeting, the invitation including an option for a user at the first endpoint device to respond to the message with a request to record the teleconference meeting; receiving from the first endpoint device a response message that contains an indication of whether or not the user will join the teleconference meeting and a request to record the teleconference meeting; and presenting at a second endpoint device to a host of the teleconference meeting the request from the user to record the teleconference meeting.

In addition, one or more computer readable storage media is provided that is encoded with software comprising computer executable instructions and when the software is executed operable to: send to a first endpoint device a message comprising an invitation to join a teleconference meeting and an option for a user at the first endpoint device to respond to the message with a request to record the teleconference meeting; receive from the first endpoint device a response message that contains an indication of whether or not the user will join the teleconference meeting and a request to record the teleconference meeting; and present at a second endpoint device to a host of the teleconference meeting the request from the user to record the teleconference meeting.

Furthermore, an apparatus is provided comprising: a network interface unit configured to enable communications over a network and a processor coupled to the network interface unit, and further configured to: send to a first endpoint device a message comprising an invitation to join a teleconference meeting and an option for a user at the first endpoint device to respond to the message with a request to record the teleconference meeting; receive from the first endpoint device a response message that contains an indication of whether or not the user will join the teleconference meeting and a request to record the teleconference meeting; and present at a second endpoint device to a host of the teleconference meeting the request from the user to record the teleconference meeting.

The above description is intended by way of example only. Various modifications and structural changes may be made therein without departing from the scope of the concepts described herein and within the scope and range of equivalents of the claims.

What is claimed is:

1. A method comprising:
   at a server device, sending to a first endpoint device a message comprising an invitation to join a teleconference meeting, the invitation including an option for a user at the first endpoint device to respond to the message with a request to record the teleconference meeting;
   receiving from the first endpoint device a response message that contains an indication of whether or not the user will join the teleconference meeting and a request to record the teleconference meeting; and
   presenting at a second endpoint device to a host of the teleconference meeting the request to record the teleconference meeting, an option to accept the request from the user to record the teleconference meeting, and an option to deny the request from the user to record the teleconference meeting, wherein presenting comprises at the second endpoint device to the host an option to record the meeting and provide access to the recording to every attendee of the meeting and an option for approval by the host before allowing any attendee to have access to the recording.

2. The method of claim 1, further comprising:
   recording the teleconference meeting; and
   providing access to the recording of the teleconference meeting only to users whose requests to record the teleconference meeting have been accepted by the host.

3. The method of claim 1, further comprising automatically recording the teleconference meeting when the teleconference meeting begins.

4. The method of claim 1, further comprising automatically providing the recording for the teleconference meeting to the first endpoint device after the teleconference meeting has ended.

5. The method of claim 1, further comprising receiving a message from the second endpoint device indicating that the host of the teleconference meeting overrides the request to record the teleconference meeting from the user and denies the request to record the teleconference meeting.

6. The method of claim 1, further comprising presenting with the invitation an option to accept the invitation together with the request to record the meeting, and an option to decline the invitation together with the request to record the meeting.

7. One or more non-transitory computer readable storage media encoded with software comprising computer executable instructions and when the software is executed operable to:
  send to a first endpoint device a message comprising an invitation to join a teleconference meeting and an option for a user at the first endpoint device to respond to the message with a request to record the teleconference meeting;
  receive from the first endpoint device a response message that contains an indication of whether or not the user will join the teleconference meeting and a request to record the teleconference meeting; and
  present at a second endpoint device to a host of the teleconference meeting the request from the user to record the teleconference meeting, an option to accept the request from the user to record the teleconference meeting, and an option to deny the request from the user to record the teleconference meeting, wherein the instructions operable to present comprise instructions operable to present at the second endpoint device to the host an option to record the meeting and provide access to the recording to every attendee of the meeting and an option for approval by the host before allowing any attendee to have access to the recording.

8. The computer readable storage media of claim 7, further comprising instructions operable to:
  record the teleconference meeting; and
  provide access to the recording of the teleconference meeting only to users whose requests to record the teleconference meeting have been accepted by the host.

9. The computer readable storage media of claim 7, further comprising instructions operable to automatically record the teleconference meeting when the teleconference meeting begins.

10. The computer readable storage media of claim 7, further comprising instructions operable to automatically provide the recording for the teleconference meeting to the first endpoint device after the teleconference meeting has ended.

11. The computer readable storage media of claim 7, further comprising instructions operable to present with the invitation an option to accept the invitation together with the request to record the meeting, and an option to decline the invitation together with the request to record the meeting.

12. An apparatus comprising:
  a network interface unit configured to enable communications over a network; and
  a processor coupled to the network interface unit, and further configured to:
    send to a first endpoint device a message comprising an invitation to join a teleconference meeting and an option for a user at the first endpoint device to respond to the message with a request to record the teleconference meeting;
    receive from the first endpoint device a response message that contains an indication of whether or not the user will join the teleconference meeting and a request to record the teleconference meeting; and
    present at a second endpoint device to a host of the teleconference meeting the request from the user to record the teleconference meeting, an option to accept the request from the user to record the teleconference meeting, and an option to deny the request from the user to record the teleconference meeting, wherein the processor is further configured to present at the second endpoint device to the host an option to record the meeting and provide access to the recording to every attendee of the meeting and an option for approval by the host before allowing any attendee to have access to the recording.

13. The apparatus of claim 12, wherein the processor is further configured to:
  record the teleconference meeting; and
  provide access to the recording of the teleconference meeting only to users whose requests to record the teleconference meeting have been accepted by the host.

14. The apparatus of claim 12, wherein the processor is further configured to present with the invitation an option to accept the invitation together with the request to record the meeting, and an option to decline the invitation together with the request to record the meeting.

15. The apparatus of claim 12, wherein the processor is further configured to automatically record the teleconference meeting when the teleconference meeting begins.

16. The apparatus of claim 12, wherein the processor is further configured to automatically provide the recording for the teleconference meeting to the first endpoint device after the teleconference meeting has ended.

17. The apparatus of claim 12, wherein the processor is further configured to receive a message from the second endpoint device indicating that the host of the teleconference meeting overrides the request to record the teleconference meeting from the user and denies the request to record the teleconference meeting.

* * * * *